Sept. 12, 1961     D. W. PROWSE ET AL     2,999,580
CONTROL OF FEEDING MOVEMENTS
Filed May 5, 1958
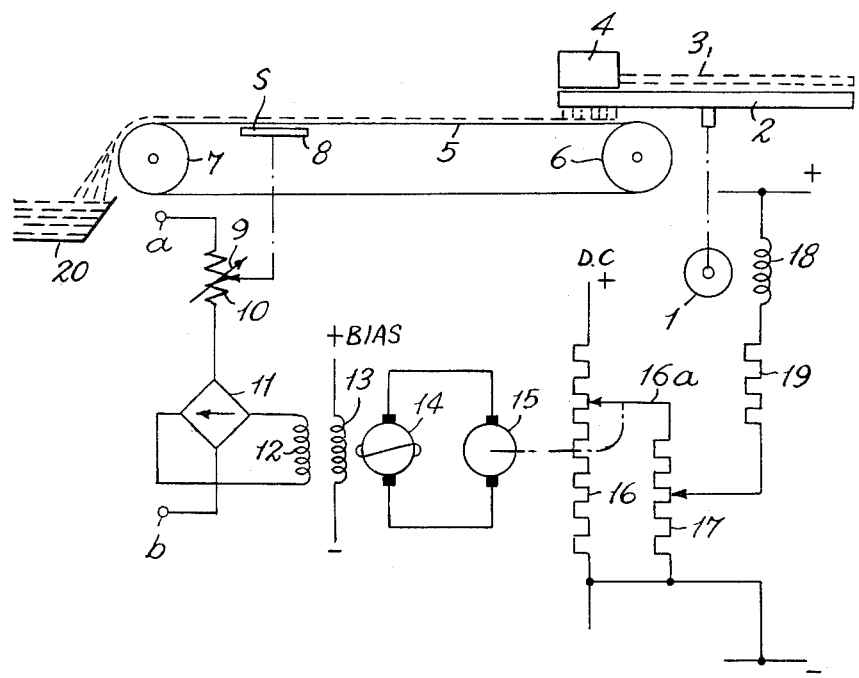
INVENTORS
DONALD WINDSOR PROWSE
RAYMOND GEORGES RAYDEN
ATTORNEY 2,999,580
CONTROL OF FEEDING MOVEMENTS
Donald Windsor Prowse and Raymond Georges Rayden, Rugby, England, assignors to The British Thomson-Houston Company Limited, London, England, a British company
Filed May 5, 1958, Ser. No. 732,999
3 Claims. (Cl. 198—37)

The present invention relates to systems for controlling the speed of a moving feeder surface in dependence upon the delivery obtained per unit time from said feeder, and aims at providing such a control which is suitable to maintain highly stable operating conditions.

To this end the present invention employs a kind of field regulation for an electric motor driving the feeder surface, the operation of which is rather continuous in contrast to discrete error signal operation. Therefore the invention is particularly advantageous where a plant, for instance a chemical plant, includes two or more feed lines for different materials which have to be carried to a vat in desired proportions. In such a plant the speed of all the feeder lines can be simultaneously controlled for adjusting the total quantity fed to a vat, by the armature voltage supplied to the various feeder motors from a common variable voltage generator, while the speed of the individual feeder lines can be controlled separately for fine adjustment by the field control of the respective driving motors.

From a general aspect the present invention resides in a system for controlling the speed of a moving feeder surface driven by an electric motor, wherein a means to influence the energisation of a control field of said driving motor is provided and includes a variable reactor having a movable core interconnected with a movable member of a measuring means, which is associated with said feeder surface so that the position of said member provides at any instant during operation an indication of the quantity of material carried on the feeder surface per unit time.

It will be understood that control according to the present invention can be associated with any moving feeder surface, such as provided by a turn table or a conveyor for instance, and positioned at any desired point of a feeder line or a system which may include two or more feeders.

For instance, the invention can serve to control the rotational speed of a turn table to which material is supplied in the form of a layer of more or less constant height, and the variable reactor member can be mechanically interconnected with a weighing beam actuated by the weight of material per unit area of a conveyor band, which weight is in a fixed proportion to the weight of material on the unit area of the turn table, as long as the ratio between the speeds of the conveyor and turn table remains constant, the material from the turn table being transferred through the conveyor band to the vat. The speed of the conveyor can also be adjusted when a considerable change in supply quantity is desired. This control does not form part of the present invention and may be accomplished by varying the voltage of current supplied from a common generator to electric motors driving the turn table and the conveyor belt, respectively.

A control system for the abovementioned arrangement will now be described by way of example and with reference to the single figure of the accompanying drawing.

An electric motor 1 drives a turn table 2 on to which powder material is loaded, by means known per se and not shown in the drawing, so as to form a layer 3 of approximately uniform and predetermined height on the turn table. As the turn table rotates a plough 4 sweeps this material off the table on to a conveyor band 5, which runs over pulleys 6, 7, driven by an electric motor (not shown), whose armature is supplied from the same source as the armature of the motor 1. At the other end of the conveyor the material is fed to a vat 20.

At a section S of the band 5 a weighing beam 8 is provided to measure the weight of the material carried per unit time which is in a certain relationship to the weight of the material per unit surface of the turn table 2. The beam 8 is mechanically interconnected with a movable member 9 to shift a core for instance, of a variable reactor 10. The winding of the reactor is connected via terminals a, b, to an A.C. supply, and through a rectifier bridge 11 to a control field winding 12 on an amplidyne machine 14 which has another field winding 13 connected to a bias voltage opposing the control signals in winding 12.

The output of the amplidyne 14 is applied to a motor 15 arranged to position the arm 16a of a potentiometer 16. The potentiometer 16 is connected to a D.C. source and supplies the field winding 18 of the motor 1. A fixed resistor 19 and a variable resistor 17 are preferably inserted between the potentiometer 16 and winding 18 for manual adjustment.

The arrangement is such that when the actual rate of feeding corresponds to that required the signal supplied through the variable reactor excites the field winding 12 of the amplidyne to produce a field which is opposed to and cancels the field produced by the winding 13, so that the amplidyne 14 has zero output and the motor 15 supplied from the amplidyne will not rotate, and the potentiometer arm 16a will not be shifted. If the feeding rate differs from the required value the beam 8 moves, the impedance of the reactor 10 is changed, the field due to the signal supplied from the reactor to the field winding 12 is not cancelled by the field produced by winding 13, and the amplidyne provides now an output suitable to rotate the motor 15 to shift the arm 16a of the potentiometer, so as to regulate the energisation of the motor 1 until the desired feeding rate is re-established when the signals from the reactor will again cause zero amplidyne output and the arm 16a of the potentiometer will be at rest.

Variations are possible without departing from this invention as defined by the appended claims. If an ordinary potentiometer is used, the mean value of the voltage required for energising the field of the motor 1 can be either above or below the voltage supplied to it, from suitable mains for instance, in which case the controlling voltage provided by the potentiometer would be subtracted from or added to the main supply voltage. However, the potentiometer 16 can be centre tapped so as to add or subtract from a main supply voltage to which the field winding of the motor is connected. Alternatively an induction regulator can be employed in lieu of the potentiometer.

What we claim is:
1. An electric control system for a motor driving a feeder which supplies solid particle material to an endless band type conveyor including an excitation circuit for said motor, a variable reactor having two co-operating parts at least one of which is movable and being constructed and arranged for a substantial relative displacement for changing the reactor inductance, a measuring means having a member arranged to be displaced in accordance with the weight of material carried on a predetermined portion only of said band type conveyor, said movable one of said two reactor parts being mechanically connected to said measuring means member and movable in accordance with movements of said member, an amplidyne generator having a field winding, a rectifier, means connecting said amplidyne field winding through said rectifier to the output of said variable reactor for control of the voltage of said amplidyne generator responsive to the weight of material as determined by said measuring means, a D.C. source, means for connecting said feeder motor excitation circuit for energization by said D.C. source, a variable impedance in said excitation circuit having a control member, and a positioning motor energized by said amplidyne generator and mechanically arranged to position said variable impedance control member for maintaining the desired feeding rate of material to the conveyor.

2. System as claimed in claim 1, wherein the amplidyne machine has another winding connected to a biasing source and arranged to oppose the field of the first winding.

3. System as claimed in claim 1, wherein the energisation circuit of said feeders drive motor excitation means includes a manually adjustable resistance.

References Cited in the file of this patent

UNITED STATES PATENTS

| | | |
|---|---|---|
| 1,751,225 | Ashbaugh | Mar. 18, 1930 |
| 1,777,670 | Hausmann | Oct. 7, 1930 |
| 1,922,883 | Crago | Aug. 15, 1933 |
| 2,618,406 | Kast | Nov. 18, 1952 |
| 2,662,665 | Harper | Dec. 15, 1953 |
| 2,763,399 | Heacock | Sept. 18, 1956 |
| 2,917,207 | Prowse | Dec. 15, 1959 |

FOREIGN PATENTS

| | | |
|---|---|---|
| 436,658 | Great Britain | Oct. 16, 1935 |
| 736,298 | Great Britain | Sept. 7, 1955 |
| 784,870 | Great Britain | Oct. 16, 1957 |